UNITED STATES PATENT OFFICE.

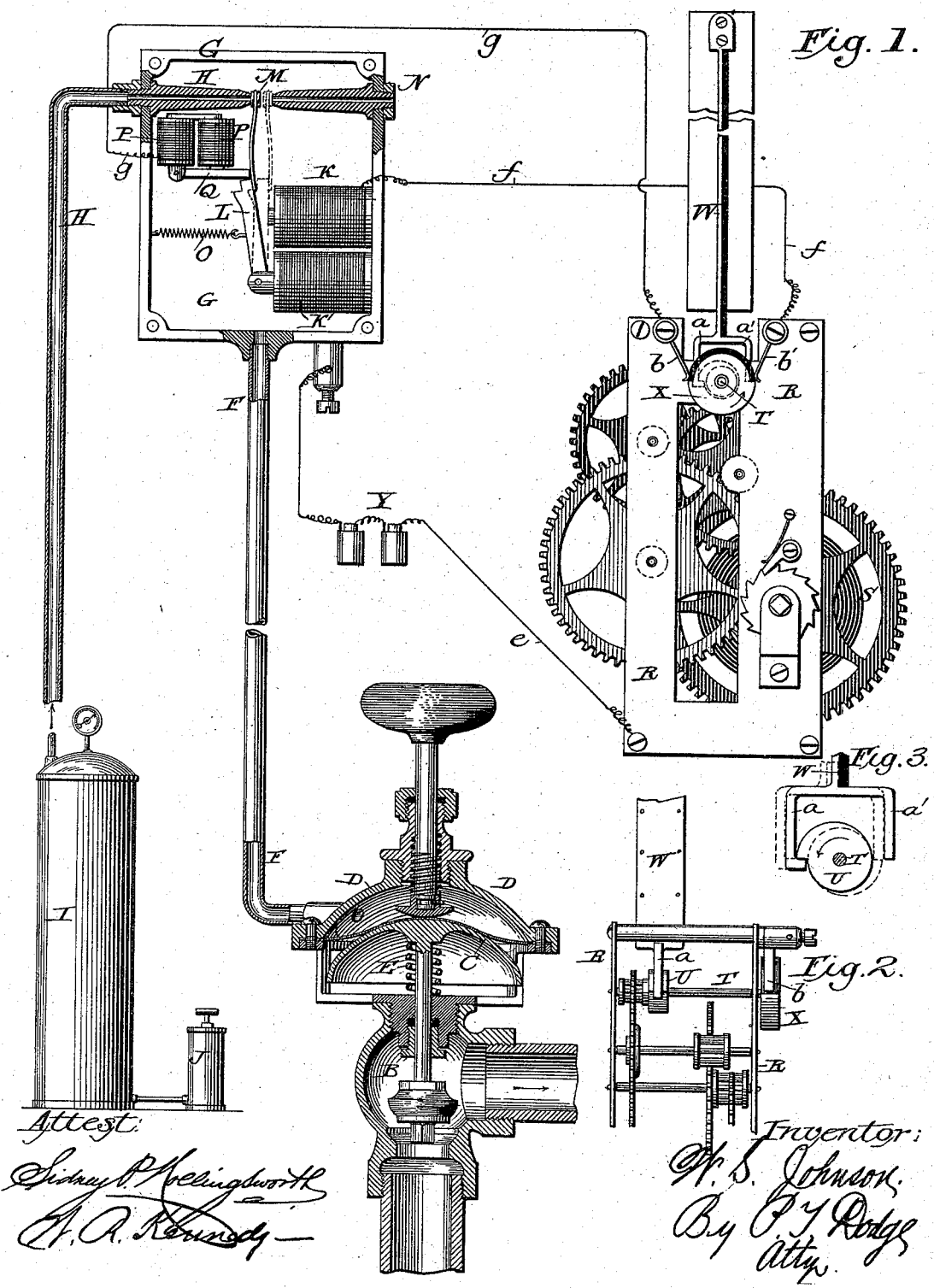

WARREN S. JOHNSON, OF MILWAUKEE, WISCONSIN.

AUTOMATIC TEMPERATURE-REGULATOR.

SPECIFICATION forming part of Letters Patent No. 382,165, dated May 1, 1888.

Application filed June 23, 1887. Serial No. 242,325. (No model.)

*To all whom it may concern:*

Be it known that I, WARREN S. JOHNSON, of Milwaukee, in the county of Milwaukee and State of Wisconsin, have invented certain Improvements in Automatic Temperature-Regulators, of which the following is a specification.

The aim of this invention is to provide a simple and reliable system in which fluid under pressure is applied subject to the control of the thermostat to open and close the valve or valves regulating the admission of steam, hot air, or other heating medium to an apartment.

In the present system the air or other fluid under pressure is admitted to an expansion-chamber which controls the main valve. The delivery of the fluid to this expansion-chamber is controlled by a secondary and electrically-actuated valve. The current for operating this electric valve is in turn controlled by a thermostat and an intermediate switch operating in conjunction with a clock-train or similar motor, by which the circuit being established through either of the thermostats by a rise or fall of temperature is automatically broken and the proper connections established for the closing of the circuit when the thermostat moves to the opposite extreme, the result being to leave the circuit open except at the instant when the thermostat reaches one extreme or the other of its movement.

I have selected for the purposes of illustration a steam-controlling valve in combination with my system of apparatus; but it is to be understood that it may be applied in like manner to registers for admitting hot air to an apartment or to the dampers of steam-boilers or hot-air furnaces.

In the accompanying drawings, Figure 1 is a view in the nature of a diagram, illustrating the complete system. Fig. 2 is an edge view of a portion of the switch and motor. Fig. 3 is a side view showing the manner in which the thermostat controls the motor for operating the switch.

Referring to the drawings, A represents a steam-supply pipe; B, an ordinary puppet-valve by which the flow of steam through the pipe is controlled. The spindle of this valve is extended through a gland or stuffing-box and provided at its outer end with a hub or enlargement which bears against a flexible sheet, C, forming one wall of a metal chamber, D, so that when fluid under suitable pressure is admitted to the chamber the flexible wall, being forced outward, will act to close the valve B. A spring, E, serves to insure the opening of the valve when the fluid is discharged from the chamber. To the chamber D, which is a familiar form of what is known in the art as an "expansion-chamber" and which may be replaced by a cylinder and piston or other equivalent form of expansion-chamber, I connect a pipe, F, opening into a valve body or casing, G, from which a second pipe, H, is continued to a reservoir, I, or other source of fluid-pressure supply. I commonly employ as the actuating-fluid air, which is maintained at a constant pressure within the reservoir I by a pump, J, or other equivalent means.

Within the valve-casing G, I mount an electro magnet, K, provided with a pivoted armature, L, the upper end of which carries a valve, M, which acts against and serves to close the air-admission pipe H. A waste-pipe, N, discharging through the side of the valve-casing, is arranged directly opposite the delivery end of pipe H and in position to be closed by the valve M when the latter moves backward to open the inlet-pipe. A spring, O, serves to hold the armature away from the magnet K when the latter is discharging, and thus to keep the inlet-pipe H normally closed.

A second electro-magnet, P, mounted in the top of the casing, is provided with a pivoted armature, Q, which serves, when released, to drop in front of the armature L and hold the latter against the mouth of the waste-pipe N, as shown in dotted lines.

R represents a suitable frame-work containing a train of gearing actuated by a coiled spring, S, a weight, or equivalent motive apparatus. At its upper end this train imparts motion to a spindle, T, carrying a stop-disk, U, having on one side a shoulder which engages alternately with the two arms $a$ and $a'$ at the lower end of a thermostatic bar, W. This bar, which is fixed rigidly in position at its upper end, consists of a strip of rubber and metal or of any other two materials which expand unequally under the same changes of temperature, in a manner familiar to every person skilled in the art. As the temperature ascends, the bar bends to the left, causing its shoulder $a$ to disengage the disk, which, under the influence of the train, immediately makes a half-revolution, when it is again arrested by contact with the arm $a$. As the temperature diminishes, the bar moves to the right, disengaging the arm $a'$, whereupon the disk makes another half-revolution, when it is arrested by contact with the arm $a$.

On the forward end of the spindle T is mounted a disk, X, one-half of whose periphery is composed of non conducting material. Two conducting-fingers, $b$ and $b'$, insulated from the frame, are arranged at opposite sides of this disk and in such position that when it is stopped in either of its two positions the fingers will rest on the non-conducting portion, and thus interrupt any circuit through the disk.

A conductor, $e$, is extended from the frame of the motor through a battery or other electric generator, Y, and thence to the metallic casing of the valve, which is in electric contact with one terminal of each of the electro-magnets. From the magnet K a conductor, $f$, is extended to the finger $b'$, and from the magnet P a conductor, $g$, is extended to the finger $b$, so that as the disk revolves its conducting-surface makes contact with the two fingers one at a time.

The operation is as follows: The parts stand normally in the position indicated in Fig. 1, both electro-magnets being demagnetized and the armature L retracted by the spring O, so that its valve M prevents the ingress of air from the receiver. At this time there is free communication between the expansion-chamber D and the external atmosphere, so that the main valve B is permitted to remain under the influence of spring E in its open position. If, now, the temperature of the surrounding air rises beyond the predetermined limit, the bar W, swinging to the left, will cause its arm $a$ to disengage the disk U, whereupon the disk X will revolve to the left, as indicated by the arrow. In so doing its conducting-surface will encounter the finger $b'$, completing the circuit from the battery through the conductor $e$, the frame of the generator, the spindle of the disk X, the disk, the finger $b'$, the conductor $f$, and the magnet K. As a result the magnet K will attract the armature L and cause its valve M to open the inlet-pipe H and close the waste-pipe N, whereupon the air will pass from the reservoir through pipe H and valve F into the chamber D, forcing its movable wall downward and closing the main valve. As soon as the valve M is moved by the magnet K, the armature Q falls behind the armature L and locks the valve in its new position, so that it is prevented from returning to the original position when the magnet K is discharged. As the switching-disk X continues its rotation, its conducting-surface leaves the finger $b'$, and the circuit is automatically broken. Under this condition of affairs the main valve will remain closed until the falling temperature of the surrounding atmosphere causes the thermostatic bar to swing to the right, whereupon the arm $a'$, disengaging the disk U, allows the switch-disk to revolve from its position shown in dotted lines in Fig. 3 to its original position. (Shown in full lines in Figs. 1 and 3.) During its second movement the conducting-surface of the disk X makes electrical contact with the finger $b$, thereby closing the circuit from the battery, as before, through the disk, the finger $b$, the conductor $g$, and the magnet P, whereupon said magnet, attracting its armature Q, unlocks the valve-armature L, which is immediately returned by the spring O to its original position, (shown by full lines in Fig. 1,) the effect being to check the influx of air from the receiver and to permit the air in the expansion-chamber D to retreat through the pipe F and waste-pipe N, thereby allowing the main valve B to open. The switch-disk X continues its rotation until it is arrested in its original position, (represented in Fig. 1,) its conducting-surface being out of contact with the finger $b$, so that the circuit is left open.

It will be observed that in my system the thermostat controls two valve-operating circuits through the conductors $f$ and $g$, respectively, that the circuits are called into action to effect the movement of the valve for a brief period of time only, and then automatically broken, both circuits being left normally in an open position.

While I have illustrated and prefer to employ under ordinary circumstances a rotary switch or circuit-controlling device, it will be understood by the skilled electrician that it may be replaced by any other approved form of switch adapted to be operated by the motor, various switches suitable for the purpose being now known in the art. It will be observed that in my present system the circuit-opening devices are, as regards their operation, independent of the valves proper and of the power by which the valves are moved.

It is manifest that the clock-train may be replaced by any other motor having its source of power independent of the power which operates the valves, and that the thermostat may be modified in form at will, provided only it is adapted by its changing positions to control the motion of the motor.

I do not claim herein a thermostat acting as a switch to control a circuit which in turn controls electro-magnetic valves. Neither do I claim a thermostat arranged to directly control a circuit which in turn controls a motor arranged to mechanically open and close a valve.

It is to be observed as a peculiarity of my present organization that the thermostat acts mechanically to control a motor which in turn opens and closes a circuit employed to operate a valve. In my present system the thermostat has no direct effect on the circuit and the motor has no direct effect on the valve.

Having thus described my invention, what I claim is—

1. In an automatic apparatus for controlling temperature, the combination, substantially as described and claimed, of a main valve, an expansion-chamber controlling the same, an electric three-way valve through which fluid under pressure is admitted to the expansion-chamber, an electric generator and circuit including the valve, a switch in said circuit, a motor by which the switch is caused to close and immediately reopen the circuit, and a thermostat mechanically controlling the action of said motor and switch.

2. In an automatic apparatus for controlling temperature, the combination, substantially as described, of a main valve, an expansion-chamber to operate the same, an electric valve with opening and closing magnets through which fluid under pressure is admitted to the expansion-chamber, a battery-line, a switch by which the circuit may be completed from the battery-line through either magnet, a motor by which the switch is caused to close and immediately reopen the circuit through first one and then the other of the magnets, and a thermostat mechanically controlling the action of said motor, whereby the motor and switch subject to the control of the thermostat are caused to apply the electric current for opening and closing the electric valve, and the latter caused to deliver into and out of the expansion-chamber the fluid by which the main valve is actuated.

3. A three-way valve and two electro-magnets to effect its movement, in combination with a battery-line, a switch through which the battery-line may be connected with one or the other of the valve-magnets, an independent motor for moving the switch, and the thermostat mechanically controlling the motor.

4. In an automatic apparatus for controlling temperature, the combination of a main valve and an expansion-chamber controlling it, an electric valve through which the fluid under pressure is admitted to the expansion-chamber, the switch controlling a circuit through which the electric valve is operated, an independent motor to actuate the switch, and a thermostat acting mechanically to control the motor.

5. In combination with a valve and an expansion-chamber to actuate the same, an electric three-way valve controlling the delivery of fluid into and from the expansion-chamber, an electric circuit including and controlling the three-way valve, a circuit-controlling switch, a motor for said switch operated by power independent of the power which moves the valves, and a thermostat mechanically controlling the motor, whereby the movement of the thermostat under changes of temperature is caused to bring the motor into action, the motor caused to apply the electric current to move the secondary valve, and the latter caused in turn to deliver the fluid which actuates the main valve into or out of the expansion-chamber.

6. In combination with a valve-controlling circuit and a switch to open and close the same, a motor to actuate the switch, and a thermostat acting directly as a detent for the motor to close and reopen the circuit.

In testimony whereof I hereunto set my hand, this 13th day of June, 1887, in the presence of two attesting witnesses.

WARREN S. JOHNSON.

Witnesses:
ELLA E. MOODY,
ROBERT R. HOSKING.